Figure 1:
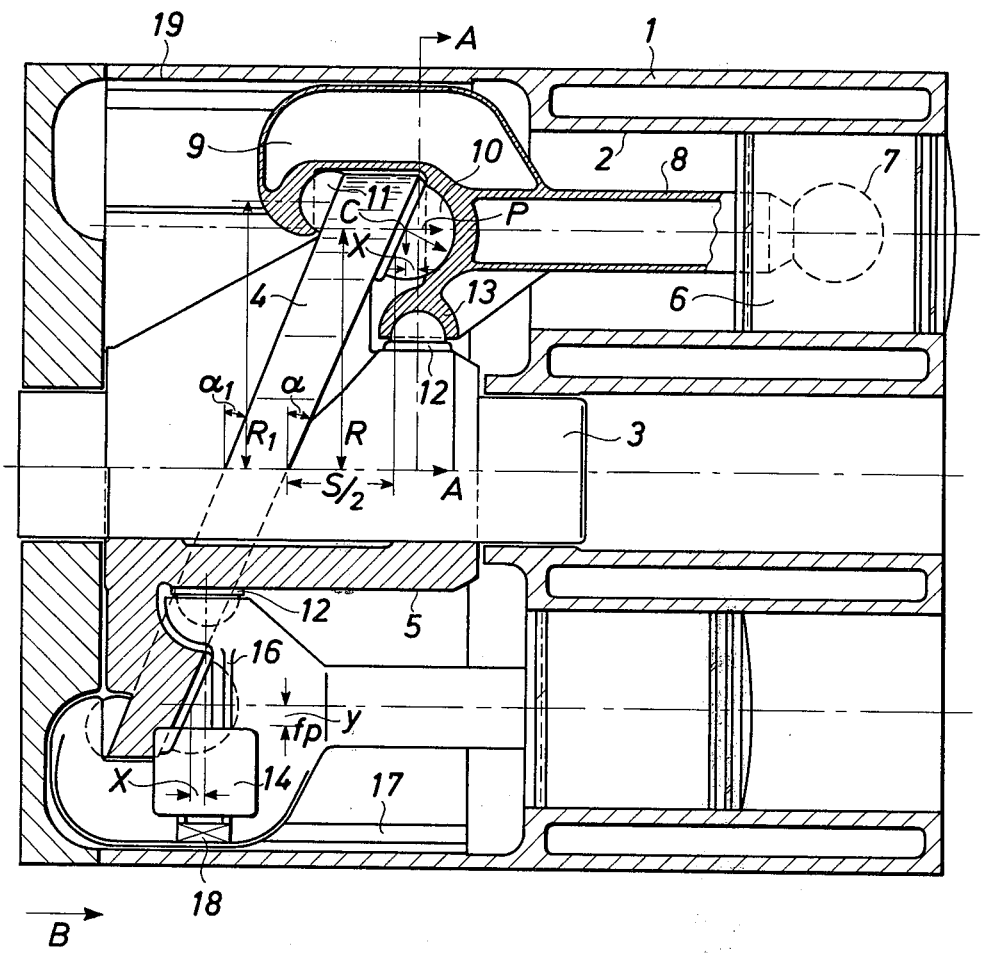

United States Patent [19]

Teisen

[11] 3,939,717
[45] Feb. 24, 1976

[54] POWER TRANSMITTING MECHANISM FOR RECIPROCATING ENGINES OR PUMPS

[75] Inventor: Mogens Roesdahl Groth Teisen, Copenhagen, Denmark

[73] Assignee: Havera Development Ltd., London, England

[22] Filed: July 3, 1974

[21] Appl. No.: 485,757

[30] Foreign Application Priority Data
July 5, 1973 Denmark ............................ 3746/73

[52] U.S. Cl. ................. 74/60; 123/58 BA; 417/269
[51] Int. Cl.[2]. F16H 23/00; F02B 75/26; F04B 1/02
[58] Field of Search ........... 74/60; 417/269; 91/499; 123/58 A, 58 AA, 58 AB, 58 B, 58 BA, 58 BB

[56] References Cited
UNITED STATES PATENTS

| | | |
|---|---|---|
| 1,001,816 | 8/1911 | Cassady ................................ 123/58 |
| 1,804,010 | 5/1931 | Greening ............................. 123/58 |
| 1,897,771 | 2/1933 | Sherman ........................... 123/58 B |
| 3,746,475 | 7/1973 | Johnson ............................... 417/269 |

Primary Examiner—William L. Freeh
Assistant Examiner—G. P. LaPointe
Attorney, Agent, or Firm—Haseltine, Lake & Waters

[57] ABSTRACT

A mechanism for reciprocating engines or pumps, the mechanism transmitting power from the axially arranged piston rods to the axially arranged main shaft via a slant fixed to said shaft and a cross head gripping and sliding on the edge of the slant. The inward directed components of the rotating transverse force vector T are absorbed by one or more Michell thrust blocks sliding on a cylindrical surface coaxial with the main shaft.

8 Claims, 2 Drawing Figures

POWER TRANSMITTING MECHANISM FOR RECIPROCATING ENGINES OR PUMPS

This invention relates to a powertransmitting mechanism for reciprocating engines or pumps of the kind in which the reciprocating movements of the pistons are converted to rotation by means of a slant having planar side surfaces and being rigidly connected to a straight main shaft — or vice versa — and in which the cylinders are arranged circumferentially around the main shaft, the cylinder axes being parallel to said shaft.

Such mechanisms have been known presumably back to 1852. However, they were not of practical importance until A. G. M. Michell proposed in 1918 to use thrust blocks — the so-called Michell blocks — as a link between the piston (or a crosshead connected with the piston) and the slant. In this way, it was possible, with a minimum of friction and without metallic contact, to transmit great piston forces to the slant, even at the very high slide speeds (above 80m/sec.) occurring in high-speed engines and pumps. In practice, this primary transmission of forces has always operated satisfactorily.

On the other hand, it created so big difficulties to provide a satisfactory absorbtion of the very great transverse forces (often more than 40 percent of the piston force) appearing in this type of engine that the further development of the latter has been essentially impeded. As appears from FIG. 1, the transverse force $T_o$ is equal to P tg $\alpha$. It is perpendicular to the cylinder axis and extends from the centre of pressure C of the main thrust block. In the shown position, in which the piston is in its top dead centre, the transverse force points towards the centre line of the main shaft. If, from this position, the slant is turned an angle $\beta$ in direction of the arrow D, cf. FIG. 2, the transverse force vector T will turn the same angle on the point C, permanently being perpendicular to the cylinder axis. Simultaneously its length alters owing to the variable gas pressures on the piston, the variable mass force of the piston and the total mass of the crosshead, and in internal combustion engines, the vector T generally reaches its maximum in the range $\beta = 0°$–$20°$. In this range, the piston speed is relatively low at the normal r.p.m. of the engine, and if the r.p.m. is reduced, the piston speed decreases correspondingly. If the gas pressure is kept constant, the piston force P increases because the mass forces counteracting it are reduced in proportion to the square of the r.p.m. Therefore the absolutely greatest value of the transverse force T appears when the engine operates with all its strength at a low r.p.m.

This has had very serious consequences for the lubrication of the previously known crosshead constructions, all of which have absorbed the reactions from the transverse force through stationary sliding surfaces. The very low piston speeds in the critical range close to the top dead centre are grossly inadequate for forming a supporting hydrodynamic lubrication film. The other means for preventing metallic contact, namely the damping in an oil film, also has very bad conditions since the great transverse forces get plenty of time for pressing out the oil, thus reducing the film thickness to a value below the critical one.

Thus, according to the invention, it is suggested that the reactions from the radially inward directed component of the rotating transverse force vector are absorbed through one or more Michell thrust blocks sliding on a cylindrical sliding surface which is co-axial with the main shaft and rigidly connected with the slant. This rotating sliding surface has a regular speed, which at any r.p.m. is great enough to maintain an efficient supporting hydrodynamic oil film, particularly when the thrust block or blocks are given the correct eccentric support, cf. FIG. 2.

In this way, the maintenance of the oil film is made independent of the reciprocating movements of the crosshead, which movements meet extremely low friction because they are perpendicular to the direction of motion of the rotating cylinder surface.

Figure 2:
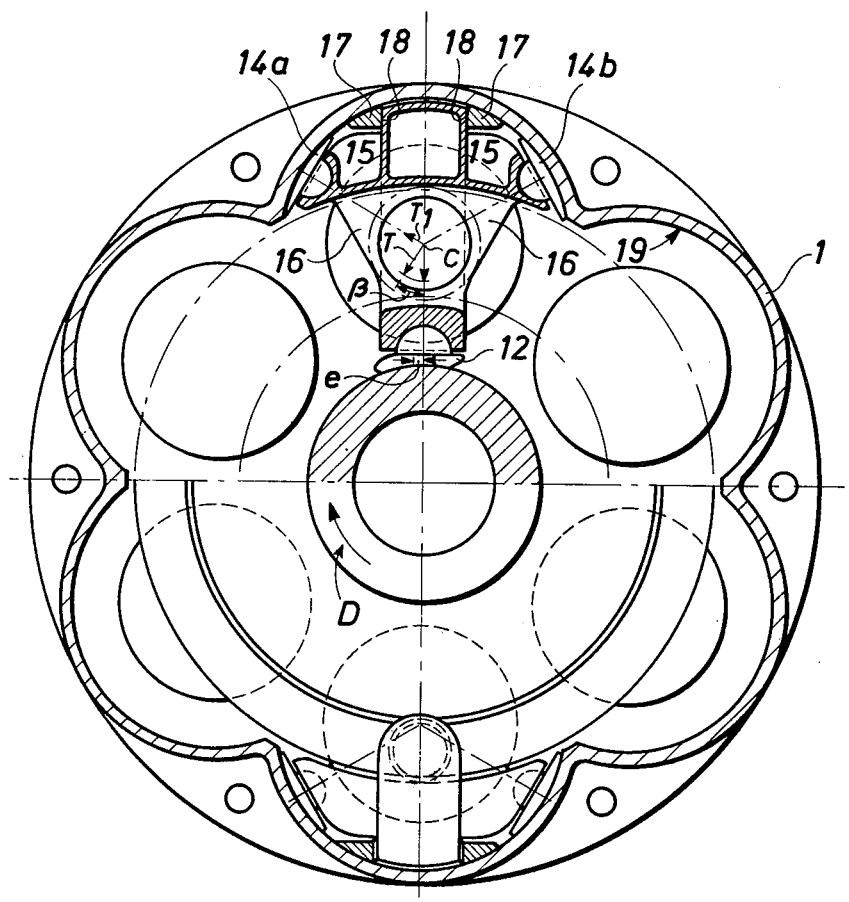

According to the invention, it is further suggested that the other components of the rotating transverse force vector are absorbed by two or more Michell thrust blocks having radial lines of action and sliding upon stationary or planar cylindrical surfaces as shown in FIG. 2. The component $T_1$ is zero when the piston is in its top dead centre, but at that moment, the thrust block 14a for absorbing $T_1$ has the sliding speed zero. Yet it must be assumed that this thrust block is separated from its sliding surface by means of an oil film having had good time to form whereas the block was unloaded in the period from $\beta = 240°$ to the top dead centre. Consequently the thrust block has a considerable damping capacity when the top dead centre is passed and $T_1$ starts increasing, and simultaneously the piston speed increases so that, already about $\beta \sim 45°$, it is sufficient for forming a hydrodynamic oil film, which is maintained up to and including $\beta = 120°$. Here the gas pressures in an internal combustion engine will practically cease, and in the period $\beta = 120°$ to $\beta = 240°$, $T_1$ is almost exclusively determined by mass forces, which are proportionate to the square of the r.p.m. and which increase in a rectlinear manner from zero in the middle of the piston stroke to their maximum value in the lower dead centre. Close to the latter, the piston speed again will be too low to maintain the hydrodynamic lubrication film, but metallic contact may be hindered by the damping, which in this area has very favourable conditions since high pressures only appear at high r.p.m.'s and thus only get a very short time for "pressing" the oil film. Consequently, when the thrust blocks are of correct size, metallic contact can be avoided in the whole working range of the engine so that the crosshead will be "all floating", which is one of the main objects of the invention.

Another object is to obtain a minimum side pressure on the piston. In accordance with the invention, this is obtained by placing the lines of action of all the "transverse thrust blocks" in a common plane perpendicular to the cylinder axis, cf. the plane A—A of FIG. 1. If this plane also passes the centre of pressure C of the main thrust block ($x = 0$ in FIG. 1), all outward piston forces will give no moment about this point provided that the centre of gravity of the crosshead is situated in the cylinder axis. However, in a rationally constructed crosshead, this will not be the case, and therefore the common centre of gravity tp of the piston and the crosshead are situated outside the cylinder axis at the distance $y$ in FIG. 1. With $y$ as moment arm the mass forces actuate the crosshead by a moment, and the reaction against the latter creates a side pressure on the piston. This side pressure may be reduced by displacing in parallel the plane A—A a little way $x$ towards the piston. If $x$ is the moment arm, the components of the transverse force T situated in the plane of FIG. 1 give a moment going in opposite direction of the $y$-moment.

When taking all the parameters of the engine into account, $x$ may be determined so that the side pressure on the piston gets insignificant. In certain parts of the working period, the mass forces on the reciprocating elements may exceed the gas forces on the piston so that the crosshead is subjected to pressure loads. These pressure loads are absorbed by the thrust block 11 sliding on the rear side of the wobble plate, and in the previously known machines of the present type, which are often called Michell engines or Michell pumps, the centre of pressure of said thrust block has been placed in the cylinder axis, the thrust block proper generally having same size as the main thrust block on the front surface of the wobble plate.

As the tensile strain on the crosshead generally is considerably smaller than the pressure load the rear thrust block must be smaller than the front block, and it must be placed in such relation to the crosshead that the latter is actuated by a minimum of forces and shows a minimum of elastic deformations and that the side pressure on the piston is minimal. According to the invention, this is obtained by placing the centre of pressure of the rear thrust block at the end of a radius $R_1$, which is greater than the radius R leading to the centre line of the cylinder, cf. FIG. 1. Since the piston movement is purely harmonic, this can be done while maintaining correct geometry if the rear surface of the wobble plate is inclined an angle $\alpha_1$, which is somewhat smaller than the angle of inclination $\alpha$ of the front surface and satisfies the equation $s/2 = R\ tg\ \alpha = R_1\ tg\ \alpha_1$, where $s$ is the stroke of the machine. Particularly in two-stroke cycle engines and only in a relatively small part of the total working period, the crosshead will be subjected to tensile strains, and as the latter are exclusively due to mass forces, they will reach a maximum at a great r.p.m. For the reasons given above, the "transverse thrust blocks" have particularly good conditions of absorbing the reactions from the transverse forces on the rear thrust block through damping so that the crosshead remains "all floating", also when subjected to tensile strain. The transverse forces on the rear thrust block in addition creates a side pressure on the piston. If one considers the moments actuating the crosshead when the latter is subjected to tensile strains, one will see that these moments and the resulting side pressures on the piston get essentially smaller when the rear thrust block works at the end of radius $R_1$ than would be the case if the rear thrust block was conventionally placed at the end of radius R.

All the bearing surfaces are lubricated with oil, which in known manner but not shown is fed under pressure to the cavity of the crosshead. From this cavity the oil is fed to the lubrication points through channels and nozzles not shown. The reliable functioning of the Michell thrust blocks is conditioned by their free mobility around their respective centres of pressure. As far as the main thrust blocks are concerned, this mobility, according to experience, is ensured by the hemisphere-shaped supporting surfaces of the blocks being forced to make a continuous "cone movement" when their thrust plates follow the angular movements of the slant. As far as the "transverse thrust blocks" are concerned, there is no corresponding movement, but as each of these blocks is completely free to load during approximately a third of their working period, pressurized oil fed to the hemisphere bearing liners with great certainty will form an oil film, which, through damping, can prevent metallic contact in such part of the working period in which the thrust block is loaded, and thus will ensure the necessary freedom of movement.

Many of the known piston or crosshead constructions have failed at high loads owing to the great elastic deformations which caused edge pressures on the bearing surfaces and inadmissibly great variations in the clearance between thrust block and slant.

A crosshead provided with supports according to the invention in principle will show the shortest possible lines of force and a natural rigidity reducing the elastic deformations to a minimum. The piston rod and the crosshead according to the invention may be moulded in one piece by precision moulding, and if this rod is connected in per se known manner with the piston through a ball-and-socket joint, the whole reciprocating assembly may be made statically determinate. As a result there is obtained a substantial immunity against the effects of machining inaccuracies and "unsymmetrical" thermal expansions, and the spherical supporting surfaces at all the thrust blocks will prevent edge pressure on the plates of the thrust blocks.

The crosshead and slant construction according to the invention overcomes the difficulties that previously have prevented the further development of the Michell engine. Thus its compact and light construction and its possibilities of perfect static and dynamic balancing may be turned to account.

The invention will be described below with reference to the accompanying drawings showing a very simple and expedient embodiment of an engine or pump having the power transmitting mechanism according to the invention.

FIG. 1 is a part-sectional side elevational view of the engine, the upper part of the slant being seen from outside, the crosshead being cut, whereas the lower crosshead is seen from outside and the slant and its cylindrical hub are cut, and FIG. 2 is a cross section of same engine where only two crossheads are shown, the upper main thrust block being removed, the crosshead and the slant hub being shown in section after the lines A—A in FIG. 1 whereas, at the lower part of the figure, the wobble plate and the crosshead are seen from outside in direction of arrow B in FIG. 1.

The cylinder block 1 comprises a plurality of cylinders 2 arranged circumferentially around the main shaft 3. This shaft is journalled in two main bearings, the outermost part of which can also work as a thrust bearing. The main shaft carries a wobble plate 4 whose hub is provided with a cylindrical surface 5 finished co-axially with the main shaft 3. In each cylinder 2, a piston 6 reciprocates, which piston is connected to a piston rod 8 by way of a ball-and-socket joint 7. The piston rod is rigidly connected to the crosshead 9 which as a claw grips the edge zone of the wobble plate. The crosshead is provided with spherical bearing surfaces carrying the main thrust block 10 and the rear thrust block 11, the block having planar contact surfaces sliding on the planar side surfaces of the wobble plate. The main thrust block 10 has a circular thrust plate with rounded edges and rigidly connected to a hemisphere whose centre C is situated in the cylinder axis at the distance R from the main axis of the machine. The rear thrust block 11 consists of a hemisphere having a rounded edge and its centre at the end of radius $R_1$, this radius being somewhat greater than R. The planar front surface of the wobble plate 4 is inclined an angle $\alpha$, which together with the radius R determines the stroke $s$ of the machine, $s/2 = R\ tg\ \alpha$.

The movement of the piston working with the stroke $s$ is purely harmonic and therefore may be followed very precisely by the rear thrust block 11 working at the end of radius $R_1$ provided that the angle $\alpha_1$ of the planar rear surface of the wobble plate satisfies the equations $s/2 = R_1\ tg\alpha_1$ and $s/2 = R\ tg\ \alpha$. If this condition is fulfilled, the thrust blocks 10 and 11 will cooperate with the planar sides of the wobble plate with a constant clearance. It is decisive of good functioning that this clearance is maintained by the greatest possible force, i.e. by the smallest possible variation resulting from elastic deformations. The upper part of the crosshead therefore is shaped as a closed, thin-walled box-section, this box although having the lowest possible weight giving maximum resistance to bending and turning caused by forces acting in the centre of pressure of the thrust block 11. Beforehand the moments of these forces are reduced as much as possible by moving the thrust block 11 so close to the neutral axis of the box-section as the regard for the necessary bearing surface of the thrust block permits.

In the shown embodiment the transverse forces T on the crosshead are absorbed by a total of three "transverse thrust blocks" whose lines of action are situated in a common plane A—A perpendicular to the cylinder axis and extending radially therefrom with same or approximately same mutual angular space, cf. FIG. 2. The inward directed thrust block 12 is journalled by its hemispherical back support in a corresponding bearing surface in a "heel" 13 moulded in one piece with the crosshead. The thrust block 12 has a cylindrical bearing surface having a square outline whose middle point is displaced a small way in relation to the centre of the hemisphere. Thus the block 12 is a typical Michell block having optimal capacity of forming a wedge-shaped and very strong supporting oil film when it abuts on the cylindrical surface 5 rotating in the direction of an arrow D, cf. FIG. 2. The formation and maintenance of this film of highly pressurized oil is independent on the reciprocating movements of the piston, said movements being "superposed" on the even tangential movement of the rotating cylinder surface 5. The two oblique outward directed transverse thrust blocks 14a and 14b are also journalled in hemispherical bearing surfaces in a pair of U-shaped supporting arms 15. The latter and the crosshead are moulded in one piece and further provided with moulded triangular supporting ribs 16. In contrast to the eccentrically supported thrust block 12, the thrust blocks 14a and 14b are concentrically supported since they must be able to work at the two part-movements of the reciprocating movement of the crosshead. In principle their thrust plates can work on planar surfaces parallel to the cylinder axis, but a cheaper, lighter and more stiff sliding surface is obtained by forming it as a cylinder surface 19 bored direct in the cylinder block, as shown in the drawing, coaxially with the main cylinder 2. On the cylindrical sliding surface 19 a control means in the form of a pair of guide ways 17 are fastened. These guide ways, when co-operating with two planar surfaces 18 of the crosshead 9, prevent the latter from turning on the cylinder axis, but may not absorb radially directed forces on the crosshead, nor consequently affect the functioning of the thrust blocks 14a and 14b. The three "thrust blocks" 12, 14a and 14b provide a statically determinate support of the crosshead at the intersection between the plane A—A and the cylinder axis, and the piston rod being supported in the centre of the ball-and-socket joint 7 of the piston, the latter and the crosshead form together a completely statically determinate system. Besides the well known advantages of calculation, such a system provides an extensive immunity to finishing inaccuracies and unsymmetrical thermal expansions. By way of example, the centre of the ball-and-socket joint 7 can be displaced many tenths of a mm perpendicularly to the cylinder axis before there is any measurable influence on the clearances in the bearings of the three "transverse thrust blocks". The spherical supports of all the thrust blocks almost will render edge pressures on the thrust plates of the thrust blocks impossible.

In a construction as shown it is therefore possible to a greater extent than usual to eliminate the disturbances that may impede the formation or maintenance of the sufficiently thick oil films making the crosshead "all floating" and hard-wearing provided that the oil is kept sufficiently clean.

The invention may be modified in many ways without departing from its idea.

What I claim is:

1. A reciprocating-piston engine or pump having a main shaft and a plurality of cylinders arranged circumferentially around the main shaft of the motor or pump, the axes of said cylinders being parallel to the main shaft, each piston being connected to a crosshead through a piston rod, a swash-plate fixed to the main shaft and gripped by the crosshead while the swash-plate side surfaces are abutted by a main thrust bearing and a rear thrust bearing, slide bearings for absorbing the force components perpendicular to the main shaft, said slide bearings absorbing the inward directed components of the rotating transverse force vector, said slide bearings comprising at least one michell thrust blocks sliding on an outwardly facing rotating cylindrical surface coaxial with said main shaft and rigidly connected to said swash-plate, said cylindrical surface being arranged on a thickening portion of said main shaft and locally cutting into one of the swash-plate side surfaces so as to form a recess in the swash-plate.

2. A motor or pump as claimed in claim 1, wherein the outward directed components of said rotating transverse force vector are absorbed by at least two Michell thrust blocks having lines of action extending radially from a point on the cylinder axis.

3. A motor or pump as claimed in claim 1, wherein the lines of action of all the transverse thrust blocks are situated substantially close to a plane A—A perpendicular to the cylinder axis and passing substantially close to the center of pressure of the main thrust block.

4. A motor or pump as claimed in claim 1, wherein the rear thrust block has its center of pressure at a greater distance from the main axis than the main thrust block, the planar rear side surface of the swash plate being inclined for forming substantially small angle to maintain correct geometry.

5. A motor or pump as claimed in claim 1, including crosshead control means arranged in the cylinder block for preventing the crosshead from turning on the cylinder axis.

6. A motor or pump as claimed in claim 1, wherein the crosshead part supporting the rear thrust bearing is hollow.

7. A motor or pump as claimed in claim 1, wherein the thickening having the outward facing cylindrical surface and the motor shaft are integral with the swash plate.

8. A motor or pump as claimed in claim 7, the thickening having the cylindrical surface is free from undercuttings.

* * * * *